Sept. 27, 1932.   R. P. AKINS   1,878,998
CONTINUOUS FILTER
Filed May 1, 1931   3 Sheets-Sheet 1
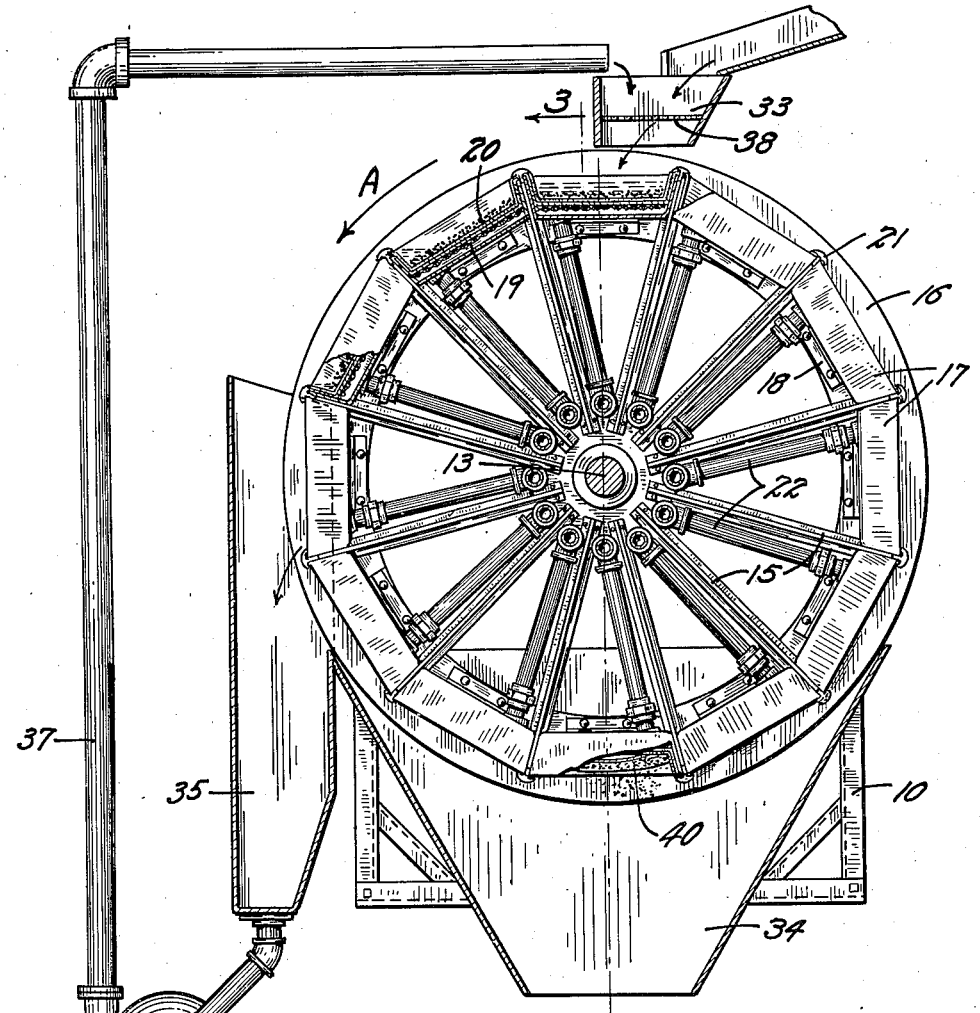
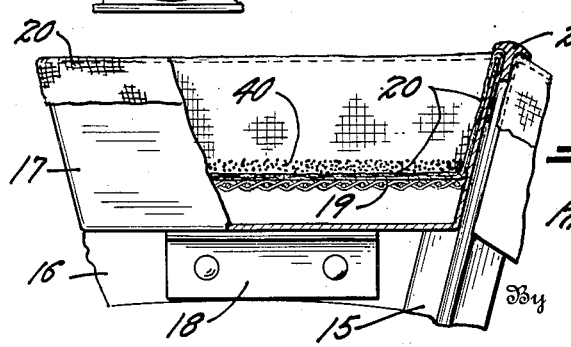
Inventor
RANDALL P. AKINS
By
Attorney Sept. 27, 1932.  R. P. AKINS  1,878,998
CONTINUOUS FILTER
Filed May 1, 1931  3 Sheets-Sheet 2
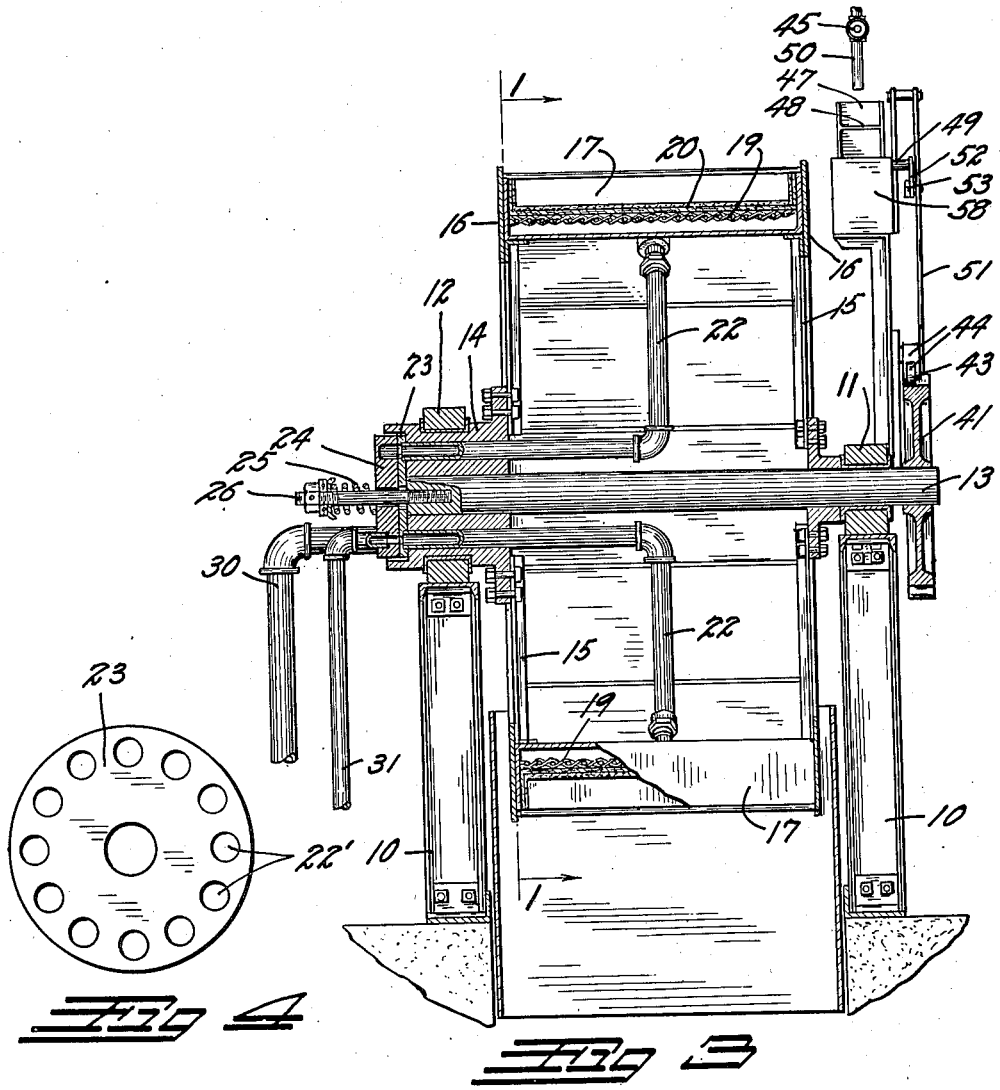
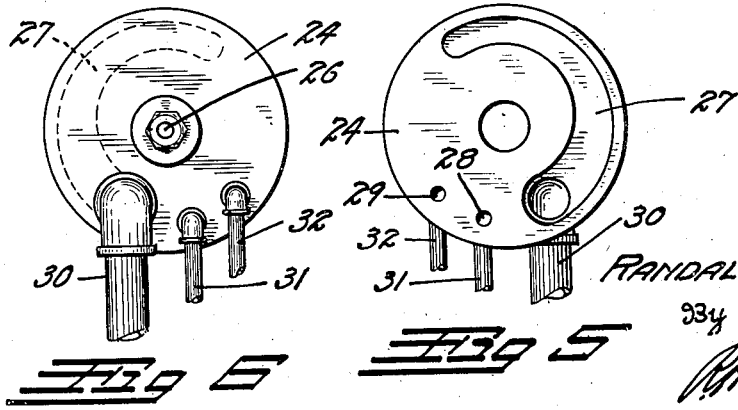
Inventor
RANDALL P. AKINS
By
Attorney Sept. 27, 1932.  R. P. AKINS  1,878,998
CONTINUOUS FILTER
Filed May 1, 1931  3 Sheets-Sheet 3
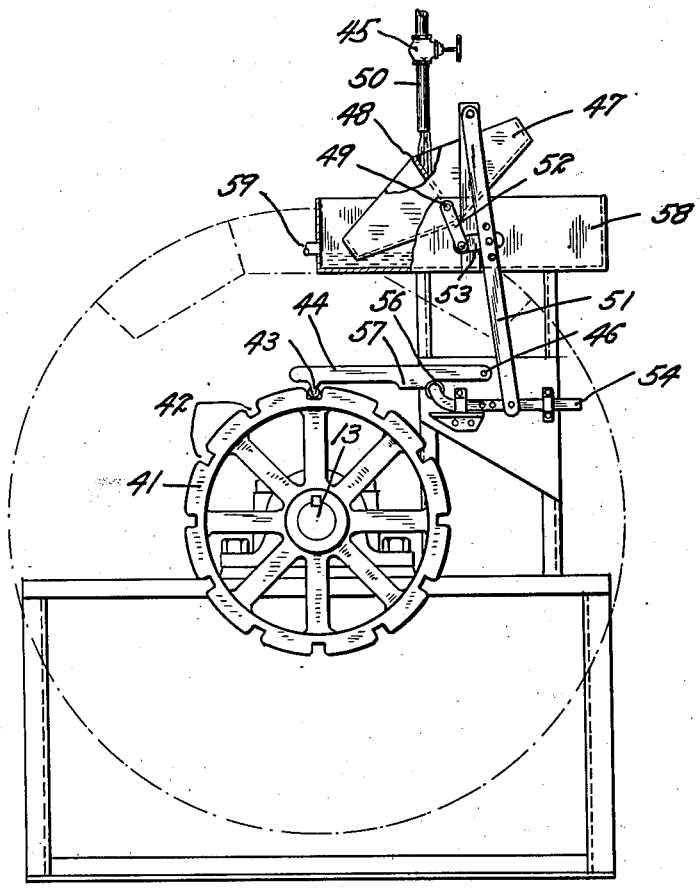
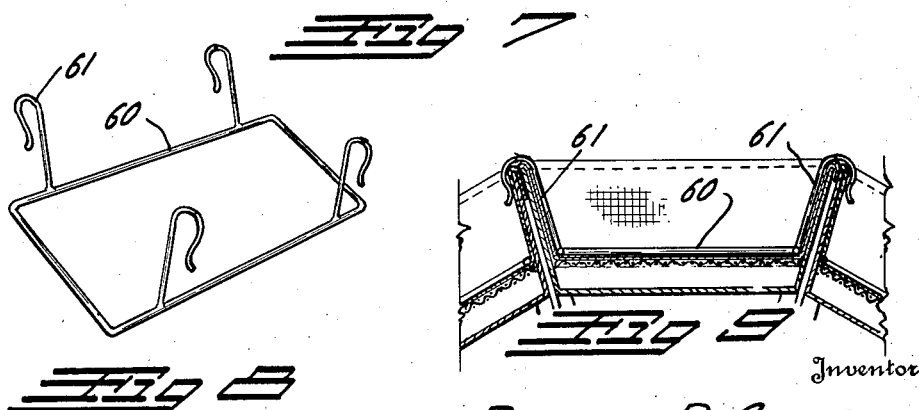
Inventor
RANDALL P. AKINS
By
Attorney Patented Sept. 27, 1932

1,878,998

UNITED STATES PATENT OFFICE

RANDALL P. AKINS, OF DENVER, COLORADO

CONTINUOUS FILTER

Application filed May 1, 1931. Serial No. 534,247.

This invention relates to a continuous filtering machine, and has for its principal object the provision of a filter which will continuously remove the filtrate from the pulp; continuously discharge the filter cake; and continuously provide a clean filter medium for the incoming pulp.

Another object of the invention is to provide a filter in which the pulp will be fed at the top of a revolving drum which will retain it in individual pockets while the filtrate is being drawn therefrom.

A further object of the invention is to provide means for removing excess filtrate which does not have an opportunity to pass through the filter medium and return this excess to the feed for retreatment.

A still further object of the invention is to so construct the machine that gravity will assist both in the filtration and in the operation of the machine and to provide an efficient governor mechanism for controlling the operation of the machine.

A still further object of the invention is to so construct the governor mechanism that it will allow the drum to rotate intermittently in accordance with the number and spacing of the pockets thereon.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a vertical section through the machine taken on the line 1—1, Fig. 3.

Fig. 2 is an enlarged detail view illustrating the construction of and the supports for the filtering pans.

Fig. 3 is a vertical section taken on the line 3—3, Fig. 1.

Fig. 4 is a detail face view of the conduit plate.

Fig. 5 is a detail view illustrating the inner face of the valve plate.

Fig. 6 is a detail view illustrating the outer face of the valve plate.

Fig. 7 is an end elevation illustrating the governor mechanism.

Fig. 8 is a detail view illustrating a frame for use in holding the filter medium in place in the filter pans.

Fig. 9 is a detail section through a filter pan illustrating the frame of Fig. 8 in place.

Briefly, the invention comprises a rotating series of outwardly facing pockets or pans arranged to receive the pulp or solution at the top and discharge the filter cake at the bottom. Between the top and the bottom, on the descending side, the filtrate is drawn through the filter medium. At the bottom the cake is discharged by means of compressed air.

This system has many advantages over the present continuous filters in that, by feeding the pulp at the top, gravity assists the filtering process and also assists in the rotation of the machine since the downwardly moving pockets will contain more or less solution and cake, while the upwardly moving pockets will be entirely empty.

One method of constructing the machine is outlined on the drawings, in which, a suitable supporting frame 10 is illustrated carrying a shaft bearing 11 and a trunnion bearing 12. A horizontal shaft 13 rotates adjacent its one extremity in the shaft bearing 11 and is carried in a trunnion block 14 adjacent its other extremity. The trunnion block 14 rotates in the trunnion bearing 12. A pair of wheels rotate with the shaft 13. Each wheel comprises a radial series of spokes 15 supporting an annular rim plate 16.

A series of filter pans 17 extend between the rim plates 16 and between each pair of the spokes 15. The pans 17 are supported on angle seats 18 riveted or otherwise secured to the rim plates 16. Each pan is provided with a screen sub-bottom 19 adapted to support a filter cloth 20 or other suitable filtering medium. The filtering medium may be brought up over the edges of the pans and wedged in place by means of T shaped wedge bars 21.

Independent conduits 22 lead from each of the pans 17 into the trunnion 14, terminating in ports 23' in a conduit plate 23. A valve plate 24 is constantly pressed against the conduit plate 23 by means of a compression spring 25, compressed under an adjusting nut upon a clamp bolt 26 secured in the end of the shaft 13. The valve plate 24 is provided with an arcuate vacuum port 27, an air port 28, and a vibrating port 29. A vacuum pipe 30 leads from the vacuum port 27 to any suitable vacuum pump. A compressed air pipe 31 leads to the compressed air port 28 from any suitable air compressor or reservoir. A second air pipe 32 leads from the vibrating port 29.

The machine is fed at the top from any suitable feed hopper 33 and the filter cake is discharged at the bottom into a receiving hopper 34. The feed hopper 33 is provided with a perforated plate 38 which acts both to distribute the feed over the entire area of the pans and also protects the pump 36, from rocks and other foreign materials. An overflow hopper 35 is positioned on the downwardly moving side of the machine. The hopper 35 communicates with a pump 36 which acts to return any over-flowing pulp through a return pipe 37 to the circuit ahead of the filter. The provision of means, such as the feed hopper 35, for catching the unfiltered portion of the solution and returning it to the feed circuit is one of the principal features of the invention. This removes all necessity for the constant and minute regulation of the feed usually necessary with continuous filters. An overfeed will in no way interfere with the operation of the filter and will always insure maximum capacity. While the return pipe 37 is illustrated as returning solution to the feed hopper 33 it could, of course, return it to any point in the circuit ahead of the filter.

The machine may be rotated in any desired manner. It is preferred, however, to allow the weight of the solution and cake in the descending pans to rotate the wheel and to provide a governor to control the rotation thereof so that the wheel will pause for an instant as each pan reaches the top so as to allow the pan to be properly filled.

This may be accomplished by means of the governor mechanism illustrated in Fig. 7 in which, a ratchet wheel 41 is secured to the shaft 13. The ratchet wheel is provided with a series of notches 42 corresponding in number to the series of pans 17. A tooth 43, formed adjacent one extremity of a gravity lever 44, is arranged to successively enter the notches 42. The other extremity of the lever 44 is hinged at 46.

The tooth 43 is caused to release itself at predetermined intervals by means of a rocking pan 47. The rocking pan is provided with a relatively high middle partition 48 which divides it into two compartments one on each side of a rocking shaft 49. A water pipe 50 controlled by a valve 45 terminates above the partition 48 so that the latter will swing from side to side thereof as the rocking pan 47 tilts.

The rocking motion of the pan 47 is communicated to a pendulum arm 51 by means of a crank 52 and a link 53 and the pendulum arm 51, in turn, transmits this motion to a sliding member 54. One extremity of the sliding member 54 carries a roller 56 which rolls back and forth along the lower edge of the gravity lever 44 as the sliding member 54 reciprocates. A projecting lug 57 is formed on the said lower edge of the gravity lever and, at each reciprocation of the sliding member 54, the roller 56 will ride under this lug and lift the tooth 43 from the notch 42.

*Operation*

The filter wheel or drum is rotated to the left, as indicated by the arrow "A", Fig. 1. As each pan reaches the top it is filled with pulp and solution from the feed hopper 33. The weight of this pulp and solution in the pans on the descending side of the drum always tends to rotate the drum in this direction. The drum, however, is prevented from rotating constantly and from attaining an excessive speed by the governor mechanism. For instance, as each pan reaches the top the tooth 43 will enter one of the notches 42 of the ratchet wheel and stop the rotation of the drum. The drum will remain stationary until the water from the pipe 50 will have filled one of the compartments of the rocking pan 47 sufficiently full to overbalance the latter so as to cause it to tilt and discharge into a receiver 58. This tilting action will reciprocate the slide 54 so as to cause the roller 56 to strike the projection 57 and lift the tooth 43 from its notch 42 in the ratchet wheel 41. As soon as the tooth 43 leaves the notch 42 gravity acts upon the drum and continues to rotate it until the next pan reaches the top at which time the tooth 43 will drop into the next notch 42 (the roller 56 having by this time passed the lug 57) and stop the drum. Thus the drum will rotate in series of intervals, the length of the stops being so regulated, by the valve 45, as to allow each pan to receive the desired quantity of pulp and solution before it leaves the top of the wheel.

The compartments of the rocking pan 47 will alternately fill with water, tilt, and decant into the receiver 58. The water discharges from the receiver through a drain 59 which is placed sufficiently far above the receiver bottom to leave a bed of water in the receiver at all times to cushion the tilt of the pan 47.

As each pan reaches the top, the vacuum conduit 22 of that pan is in communication with the vacuum port 27 so that the filtrate will be sucked through the filter medium.

It will be noted that the filtrate conduits 22 are connected toward the left side of each pan so that they will be opposite the lowermost points of each pan, and opposite the position of the filtrate therein, as the pans rotate downwardly. Thus, the filtrate is drawn or sucked through all of the vacuum conduits on the downwardly moving side until each of these conduits pass the lower extremity of the vacuum port 27 at which time the suction will be closed off. Each conduit will then successively pass over the two air ports 28 and 29.

The first port is so positioned that it will cause air pressure to be injected behind each of the filter mediums as they reach the bottom of their travel. This air will blow the filter cake from the filter medium and discharge it into the receiving hopper 34. The conduit will then move over the vibrating port 29. This port is preferably connected through a pump or valve to provide a rapidly alternating or vibrating current of air, that is, first it will blow the filter cloth or medium filter cloth or medium outwardly and then draw it inwardly in rapid succession so as to vibrate the filter medium and loosen any adhering portions of filter cake. This vibration thoroughly cleans the filter medium so that it will be ready to receive a fresh supply of pulp upon arriving again at the top.

It is possible that some of the pulp or solution may overflow either to the right or left from the uppermost pan. The solution overflowing to the right will be caught and retained in the rising pans until they reach the top. That overflowing to the left will be caught in the descending pans and will be acted upon by the vacuum. Should the feed be excessive, or should the wheel be rotating more rapidly than the conduits 22 can remove the filtrate, a portion of it will remain in the descending pans. This portion will discharge into the overflow hopper 35 as the pans descend and will be returned to the feed hopper 33 by the pump 36.

It will be noted that the pulp is maintained above the filter mediums at all times so that gravity will assist in drawing the filtrate through the medium.

To prevent the filter medium from being balloned out of the pans by the action of the compressed air, a frame 60, such as illustrated in Figs. 8 and 9 may be employed. The frame 60 is of a size to fit into the bottom of the pans 17 adjacent the walls thereof and may be held in place by means of spring clips 61 arranged to clamp over the pan edges.

The term "drum" as used herein designates the complete structure of the wheels and pans.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A continuous filter comprising: an annular series of outwardly facing receptacles, said series arranged to rotate about an axis in a vertical plane; a filter medium in said receptacles; means for creating a partial vacuum in said receptacles on the descending side of said series; means for feeding material at the top of said series; and an overflow hopper positioned to one side of said axis and extending beneath the descending side only of said series so as to receive the overflow, if any, from the receptacles at said descending side.

2. A continuous filter comprising an annular series of outwardly facing receptacles, said series arranged to rotate about an axis in a vertical plane; a filter medium in said receptacles; an indepenedent conduit from each receptacle; means for creating a partial vacuum in said conduits on the descending side of said series; means for feeding material at the top of said series; and means for stopping the rotation of said series for an interval as each receptacle reaches a certain predetermined position.

3. A continuous filter comprising: an annular series of outwardly facing receptacles, said series arranged to rotate about an axis in a vertical plane; a filter medium in said receptacles; an independent conduit from each receptacle; means for creating a partial vacuum in said conduits on the descending side of said series; means for feeding material at the top of said series; a notched wheel arranged to rotate with said series; a tooth positioned to engage in the notches of said wheel as each receptacle reaches the feeding means; and means for withdrawing said tooth after a predetermined interval.

4. A continuous filter comprising: an annular series of outwardly facing receptacles, said series arranged to rotate about an axis in a vertical plane; a filter medium in said receptacles; an independent conduit from each receptacle; means for creating a partial vacuum in said conduits on the descending side of said series; means for feeding material at the top of said series; a notched wheel arranged to rotate with said series; a tooth positioned to engage in the notches of said wheel as each receptacle reaches the feeding means; means for withdrawing said tooth after a predetermined interval, said latter means comprising a two compartment pan; means for alternately filling and emptying the compartments of said pan so as to cause the latter to tilt; and means for transmitting said tilting action to said tooth so as to withdraw the latter from successive notches of said wheel.

5. A continuous filter comprising: an annular series of outwardly facing receptacles, said series arranged to rotate about an axis in a vertical plane; a filter medium in said receptacles; an independent conduit from each receptacle; means for creating a partial vacuum in said conduits on the descending side of said series; means for feeding material at the top of said series; a notched wheel arranged to rotate with said series; a tooth positioned to engage in the notches of said wheel as each receptacle reaches the feeding means; means for withdrawing said tooth after a predetermined interval, said latter means comprising a two compartment pan; means for alternately filling and emptying the compartments of said pan so as to cause the latter to tilt; means for transmitting said tilting action to said tooth so as to withdraw the latter from successive notches of said wheel, said latter means comprising a lever carrying said tooth; a projection on said lever; and a sliding member operated in consequence of the tilting of said pan and arranged to engage said projection so as to cause said lever to lift said tooth.

6. A continuous filter comprising: an annular series of outwardly facing receptacles adapted to rotate in a vertical plane; a filter medium in each of said receptacles; means for creating a partial vacuum below the filter medium in each of said receptacles during a portion of their rotation; means for feeding material into said receptacles; and means for stopping the rotation of said series for an interval as each receptacle reaches a predetermined position.

7. A continuous filter comprising: an annular series of outwardly facing receptacles adapted to rotate in a vertical plane; a filter medium in each of said receptacles; means for creating a partial vacuum in said receptacles below said filter medium during a portion of their travel; means for feeding material into said receptacles at the top of said series; a receiving hopper enclosing the lower sector of said series; and an overflow hopper enclosing a sector of said series to one side of said receiving hopper, said two hoppers having independent discharges.

In testimony whereof, I affix my signature.

RANDALL P. AKINS.